April 30, 1968 R. R. WALSH 3,381,286
AUTOMATIC ALARM ANNUNCIATOR CIRCUITS
Filed June 18, 1964 3 Sheets-Sheet 1

FIG.1.

INVENTOR
Robert R. Walsh
BY
Herbert M. Birch
ATTORNEY

FIG. 2.

April 30, 1968   R. R. WALSH   3,381,286
AUTOMATIC ALARM ANNUNCIATOR CIRCUITS
Filed June 18, 1964   3 Sheets-Sheet 3

FIG.3.

INVENTOR
Robert R. Walsh

BY Herbert M. Birch
ATTORNEY

United States Patent Office 3,381,286
Patented Apr. 30, 1968

3,381,286
AUTOMATIC ALARM ANNUNCIATOR CIRCUITS
Robert R. Walsh, Wilmington, Del., assignor to All American Engineering Company, Wilmington, Del., a corporation of Delaware
Continuation-in-part of application Ser. No. 352,516, Mar. 17, 1964. This application June 18, 1964, Ser. No. 376,197
11 Claims. (Cl. 340—213.1)

This invention relates to automatic alarm annunciator circuits and more particularly to systems incorporating the same in which a visual indication is provided to automatically denote which one of a series of annunciator circuits is first energized by a given condition.

This application is a continuation-in-part of my copending application Ser. No. 352,516 filed Mar. 17, 1964.

The circuits comprising the subject matter of this invention are used in applications relating to chemical and other industrial processes for the purpose of monitoring such variable process parameters as temperature, pressure, flow rate, and many others. The transducer means associated with each parameter being monitored usually includes monitoring switches having either normally open or normally closed switch contacts which close or open, respectively, when the parameter being monitored exceeds its normal prescribed limits.

These monitoring switches are each connected with alarm annunciator circuits which provide audible and visual indication at a remote point or points of an abnormal or off-normal condition of a given parameter. The audible signal is of the horn or bell type while the visual signal is preferably a flashing light. The audible signal may be common to all points being monitored in a given process or the like but the visual signals are individually associated with each of the monitoring switches.

Each alarm annunciator circuit is equipped with an "acknowledge" switch at the remote monitoring point which is adapted to be closed by the operating personnel for the purpose of acknowledging the operator's awareness of an abnormal condition. This switch deenergizes the audible alarm and changes the operating format of the visual alarm from flashing to steady for the purpose of indicating that the process is still malfunctioning but that the operating personnel are aware of this condition.

As soon as normal conditions are restored, the visual alarm is restored to the state representing the said normal conditions.

The two generally preferred standards for alarm annunciator circuits in industry are commonly referred to as sequence A and sequence B.

In sequence A operation the "normal" condition is signified by an extinguished visual alarm and a silenced audible alarm; the "abnormal" condition by a flashing visual signal and an energized audible alarm; and the "acknowledge" condition by a steady visual signal and a silenced audible alarm. Sequence B differs only in the provision of a dimly illuminated visual signal in the "normal" condition.

There are many applications in which a plurality of alarm annunciator circuits are utilized to monitor various process parameters, all of said annunciator circuits being ganged to a common power source. Under these conditions, an abnormal condition in a single process parameter will substantially instantly energize the annunciator circuit which is directly monitoring it but may subsequently, and quite rapidly, cause consequential unbalances in the process system which will energize one or more of the other annunciator circuits in the monitoring network.

Thus, confusion would result without a positive means for identifying which one of the plurality of annunciator circuits was the first to be energized, thus pinpointing the process parameter and/or the position in the process system associated with the abnormal condition.

It is, therefore, an object of the present invention to provide visual sequence annunciator circuits and systems for a ganged plurality of alarm annunciator circuits which provide a visual indication of which one of said plurality of circuits is first energized during a sequential or multiple energization of more than one of said plurality of circuits.

Another object of this invention is to provide a ganged alarm annunciator circuit system for simultaneously monitoring a plurality of process variables including novel circuit means for monitoring said variables and novel circuit means for providing a visual indication of which one of a plurality of energized annunciator circuits in said system was the first to be energized.

Another object of this invention is to provide ganged alarm annunciator systems for both sequence A and sequence B operation.

Another object of this invention is to provide ganged alarm annunciator systems including visual indicating means for determining which of one of a plurality of energized annunciator circuits was the first to be energized, wherein all of the active circuit means therein are silicon controlled rectifiers.

Still another object of this invention is to provide ganged alarm annunciator circuit systems including new and novel alarm annunciator circuits in which when an "abnormal" condition response is initiated by only a momentary variation at the remote monitoring point, actuation of the acknowledge switch will result in a return of the system to the "normal" state, rather than to a condition in which the visual alarm is constantly energized.

These and other objects of this invention will become more fully apparent with reference to the following specification and drawings which relate to a preferred embodiment of the invention.

Figure 1:
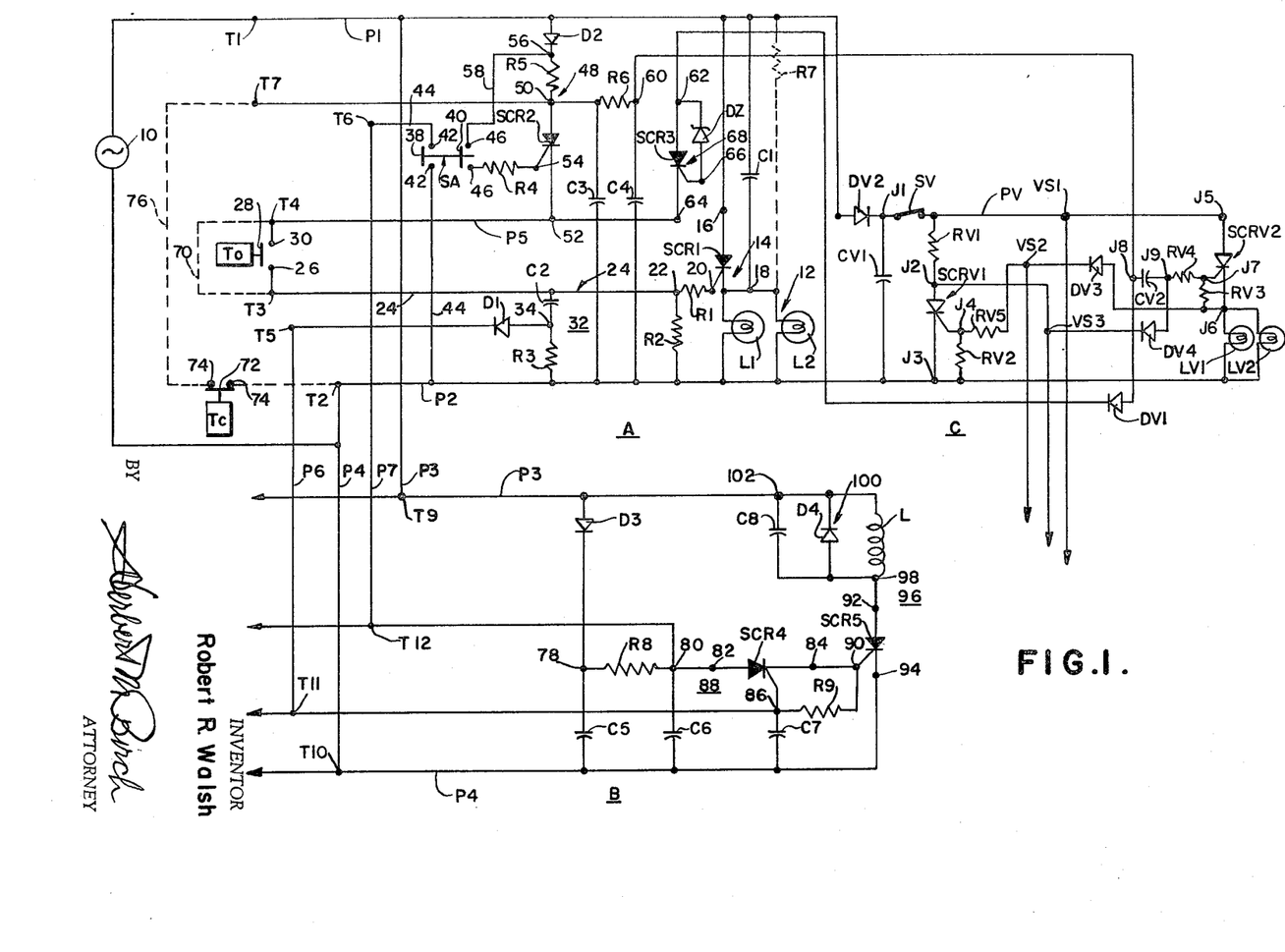
FIGURE 1 is a schematic of a first embodiment of an alarm annunciator circuit and associated visual sequence annunciator circuit of the present invention.

Referring in detail to FIGURE 1 one embodiment of the alarm annunciator circuit of the present invention is shown as comprising a first visual alarm and sensing circuit A, a second audible alarm circuit B and a visual sequence annunciator circuit C.

The first circuit A is supplied with A.C. power from an A.C. source 10 connected between first and second power leads P1 and P2 via terminals T1 and T2, respectively, P2 being a common or potential reference lead for the first circuit A.

The second circuit B is powered from the A.C. source 10 via first and second extension leads P3 and P4 connected, respectively, to the first and second terminals T1 and T2 in the visual alarm circuit A and through terminals T9 and T10 in the audible alarm circuit B. The second extension lead P4, like the second power lead P2, is a common or potential reference lead for the second circuit B.

The visual alarm means 12 comprises first and second signal lamps L1 and L2, respectively, connected in parallel. One side of the said visual alarm means is connected to the common power lead P2 while the other side is connected through one side of a visual alarm energizing circuit 14 to the first power lead P1.

The visual alarm energizing circuit 14 includes, as active circuit element, a first silicon controlled rectifier SCR1, hereinafter referred to solely as SCR1, having anode, cathode and gate terminals 16, 18 and 20, respectively. The anode terminal 16 is connected with the first power lead P1, the cathode terminal 18 is connected with the said other side of the said visual alarm means 12, and the gate terminal 20 is connected with one side of a current limiting first resistor R1, the other side of which is connected to a junction point 22. The junction point 22 is connected through a second resistor R2, with the common power lead P2. Optionally, the alarm trigger circuit 12 may include a first capacitor C1 connected between the cathode terminal 18 of the SCR1 and the first power lead P1 for the purpose of by-passing transient pulses around the SCR1 under operating conditions which produce these pulses.

A lead 24 extends from the junction point 22 to a third terminal T3 which is connected with first switch contact 26 of a normally open transducer switch T₀ additionally comprising a switch bar 28 and a second contact 30, the said contacts being adapted to be bridged by the said switch bar. The second contact 30 of the switch T₀ is connected through a fourth terminal T4 to a third common lead P5 which is associated with a plurality of circuits to be hereinafter described.

A signal coupling circuit 32 for effecting a triggering of the audible alarm when the visual alarm is triggered is connected between the lead 24 and the second common lead P2. The coupling circuit 32 comprises a second capacitor C2 connected at one side to the lead 24 and at the other, through a junction point 34 in series with a third resistor R3 between the lead 24 and second common lead P2, and a diode D1 connected at its anode to the said junction point 34 and at its cathode to a lead 36 which leads to an output terminal T5.

The output terminal T5 in the first circuit A is connected to a third terminal T11 in the second circuit B via a third extension lead P6.

A sixth terminal T6 in the first circuit A is connected with a fourth terminal T12 in the second circuit B via a fourth extension lead P7. An "acknowledge" switch SA comprising first and second ganged switch bars 38 and 40, respectively, is interconnected with the said sixth terminal T6.

The first switch bar 38 is adapted to bridge a first pair of contacts 42 which are in series in a lead 44 extending from the sixth terminal T6 to the common power lead P2.

The second switch bar 40 is adapted to bridge a second pair of contacts 46.

The acknowledge trigger circuit 48 includes a second silicon controlled rectifier SCR2, hereinafter referred to merely as SCR2, having anode, cathode and gate terminals 50, 52 and 54, respectively. Further included is a second diode D2 connected at its anode to the first common lead P1 and at its cathode to a junction point 56 which in turn is connected to one of the second pair of contacts 46 in the acknowledge switch SA via a lead 58. The other of the contacts 46 is connected with the gate terminal 54 of the SCR2 via a resistor R4.

The junction point 56 is joined with the anode terminal 50 of the SCR2 via a current limiting fifth resistor R5.

The cathode terminal 52 of the SCR2 is connected to the third comon lead P5 while the anode terminal 50 is coupled to the said second common lead P2 through a third capacitor C3.

The anode terminal 50 of the SCR2 is further coupled to one side of a sixth resistor R6, the said resistor being coupled at its other end to a junction point 60.

The junction point 60 is coupled with the second common lead P2 via a fourth capacitor C4, and with the anode terminal 62 of a third silicon controlled rectifier SCR3, hereinafter referred to merely as SCR3 through the anode-cathode path of a coupling diode DV1. The SCR3 further includes a cathode terminal 64 connected with the third common lead P5 and a gate terminal 66. The gate terminal 66 of the SCR3 is connected to the anode terminal 62 thereof through a Zener diode DZ, the latter having its anode at the said gate terminal 66 and its cathode at the said anode terminal 62 to complete a trigger circuit 68 for the visual alarm means 12.

For sequence B operation of the first circuit A, a seventh resistor R7 shown in dotted lines is connected in shunt with the SCR3 from the first common line P1 to the cathode terminal 18 of the said SCR3.

When it is desired to use the first circuit A with detector switches which are normally closed, the terminals T3 and T4 thereof are short circuited by the dotted lead 70 and a normally closed transducer switch T_c comprising a switch bar 72 adapted to break the circuit between a pair of contacts 74. The contacts 74 are in series in a dotted lead 76 extending from the terminal T2 on the second common lead P2 to a terminal T7 which is directly connected with the anode terminal 50 of the SCR2 in the acknowledge trigger circuit 48.

The second circuit B, for audible alarm annunciation, is identical for both sequence A and sequence B operation and will now be described.

A first branch circuit comprising a third diode D3 and a fifth capacitor C5, connected in series through a common junction point 78, is connected between the common leads P3 and P4. The anode of the said third diode D3 is connected with the common line P3.

The junction point 78 is connected with another junction point 80 through an eighth resistor R8. The junction point 80, in turn, is connected directly to the terminal T12, is connected through a sixth capacitor C6 to the common lead P4, and is also directly connected to the anode terminal 82 of a fourth silicon controlled rectifier SCR4, hereinafter referred to merely as SCR4, which further includes a cathode terminal 84 and a gate terminal 86 and which comprises the active element of an audible alarm trigger circuit 88.

The gate terminal 86 of the SCR4 is directly connected with the terminal T11, is coupled with the common line P4 through a seventh capacitor C7 and is connected through a ninth resistor R9 with the gate terminal 90 of a fifth silicon controlled rectifier SCR5, hereinafter referred to merely as SCR5, which further includes an anode terminal 92 and a cathode terminal 94 and which comprises the active element of an audible alarm energizing circuit 96.

The cathode terminal 94 of the SCR5 is directly connected with the common lead P4. The anode terminal is connected with a first common terminal 98 on the audible alarm means 100. A second common terminal 102 is provided on the opposite side of the audible alarm means 100 and is connected with the other common lead P3.

The electrical components of the audible alarm means, which is shown is a horn or buzzer, comprise an eighth capacitor C8 a relay coil L and a fourth diode D4 all connected in parallel between the common terminals 98 and 102. The fourth diode D4 has its anode and cathode connected with the common terminals 98 and 102, respectively.

The visual sequence annunciator network C is connected across the power source 10 at the common leads P1 and P2, the connection with the lead P1 being made via the anode of a half-wave rectifier diode DV2.

A reference capacitor CV1 is connected from the cathode terminal J1 of the rectifier DV2 to the common lead P2. The cathode terminal J1 thus becomes a reference node for the visual sequence annunciator network C and is connected thereto via a normally closed control switch SV and a reference lead PV.

A selective disabling means for ganged systems applications of the visual sequence annunciator network C is provided comprising a silicon controlled rectifier SCRV1, hereinafter referred to merely as the SCRV1, having cathode and gate terminals J2, J3 and J4, respectively, the anode terminal J2 being connected through a dropping resistor RV1 to the reference lead PV, the cathode terminal J3 being connected with the common lead P2 and the gate terminal J4 being connected via a resistor RV2 with the said cathode terminal J3.

Visual annunciation of an enlarged condition of the alarm annunciator circuits A and B is provided by parallel connected lamp means LV1 and LV2, connected in circuit with a silicon controlled rectifier SCRV2, hereinafter referred to merely as the SCRV2.

The SCRV2 includes anode, cathode and gate terminals J5, J6 and J7, respectively, the anode terminal J5 being connected directly with the reference lead PV, the cathode terminal J6 being connected through the lamp means LV1 and LV2 to the common lead P2 and the gate terminal J7 being connected through a resistor RV3 with the said cathode terminal J6.

The gate terminal J7 of the SCRV2 is further connected in series with a limiting resistor RV4 and a coupling capacitor CV2 to an input node J8, the said node J8 being also in common connection with the junction point 60 in the annunciator circuit A and the anode terminal of the coupling diode DV1.

The respective circuits of the SCRV1 and SCRV2 are interconnected at first, second and third visual sequence network terminals VS1, VS2 and VS3, respectively, which will be hereinafter more fully be described in connection with FIGURE 3.

The first network terminal VS1 is common to the reference lead PV.

The second network terminal VS2 is connected through a limiting resistor RV5 to the gate terminal J4 of the SCRV1 and through the cathode terminal of a coupling diode DV3 to the cathode terminal J6 of the SCRV2.

The third network terminal VS3 is connected directly to the anode terminal J2 of the SCRV1 and through the cathode terminal of a coupling diode DV4 to the common junction J9 between the coupling capacitor CV2 and limiting resistor RV4 in the gate circuit of the SCRV2.

*Operation*

Referring again to FIGURE 1 the operation of this embodiment of the invention in the sequence A mode will now be described.

First, it is assumed that all conditions are initially normal in the system and that the normally open transducer switch $T_o$ is being used to effect the monitoring of a condition.

When the given condition becomes abnormal, the switch bar 28 makes the circuit through itself and the contacts 26 and 30, short-circuiting the terminals T3 and T4 and connecting the cathode terminal 64 of the SCR3 with the junction point 22 at the gate circuit of the SCR1 via the third common lead P5, the said terminals T3 and T4 and the lead 24.

The current supplied to the fourth capacitor C4 via second diode D2, fifth resistor R5, and sixth resistor R6 charges fourth capacitor C4 to a potential equal to the positive peak potential of the AC power supplied to circuit A via terminal T1.

This potential is designed to exceed the breakdown potential of Zener diode DZ. When transducer $T_o$ closes it completes the cathode circuit of SCR3 from cathode terminal 64 via switch $T_o$, junction 22, and resistor R2, to the second common lead P2. This permits Zener diode DZ to break down under the influence of the stored potential on fourth capacitor C4 and conduct a small current to the second common lead P2 via the gate terminal 66 of SCR3, the cathode terminal 64 of SCR3, switch $T_o$, junction 22, and resistor R2. The small current through the gate of SCR3 triggers it into full conduction allowing the entire energy store of fourth capacitor C4 to flow as a large current pulse to second common lead P2 via the coupling diode DV1, anode terminal 62 of SCR3, cathode terminal 64 of SCR3, switch $T_o$, junction 22, and resistor R2. The resistance offered by R2 to this current pulse is sufficient to divert a portion of said current pulse through resistor R1 to the gate terminal 20 of SCR1 thus triggering SCR1 into conduction causing lamps L1 and L2 to flash for the duration of the pulse.

As long as the acknowledge switch SA is not closed by an operator, the capacitor C4 will alternately charge through D1, resistor R5 and resistor R6 and discharge through the coupling diode DV1, the SCR3, resistor R2 and resistor R1 to effect a flashing of the alarm lamps L1 and L2 at a rate determined by the time constant of the R–C combination R5–R6–C4.

Since in the acknowledge trigger circuit 48 the combined resistance R5–R6–R2 is sufficient to prevent a sustaining current in the SCR3 when the capacitor C4 is discharged, the SCR3 is thus only fired in accordance with the said rate determined by the above-defined time constant. The anode supply to the SCR1 is alternating current and thus provides a periodic interruption cutting off the SCR1.

The energy pulse from the SCR3 charges the second capacitor C2 in the output circuit 32 which discharges through the third resistor R8 and the coupling path comprising diode D1, lead 36, terminal T5, extension lead P6 and terminal T11 to charge the seventh capacitor C7 in the audible alarm trigger circuit 88.

When the capacitor C7 reaches a predetermined level of charge, it delivers a charging current through the gate terminal 86 of the SCR4 triggering the same and sending a pulse of energy to the gate terminal 90 of the SCR5. This triggers the SCR5 causing current to flow in the audible alarm energizing circuit 90 and sounds the alarm 100.

The SCR4 is held on by way of the D.C. voltage maintained on the filter capacitors C5 and C6 fed by the third diode D3.

The relay coil L of the audible alarm means 100 is held energized by the smoothing capacitor C8 in parallel therewith and the SCR5. The audible alarm means 100 is protected from transient surges from the relay coil L by the fourth diode D4.

Thus, at this stage in the operation, the first part of sequence A operation has been effected, namely, flashing visual signal means 12 and continuous audible signal means 100.

Once an operator has noted the indicated abnormal condition sensed by the transducer $T_o$, the acknowledge switch SA is closed causing the switch bars 38 and 40 to bridge the contact pairs 42 and 46, respectively.

The filter capacitor C6 is immediately short circuited through the switch bar and contacts 38 and 42, via terminal T12, extension lead P7, and lead 44, the common leads P2 and P4 being at the same potential. This causes the voltage at the anode terminal 82 of the SCR4 to drop below that required to hold the SCR4 on and effects its cut off. When the SCR4 cuts off it removes the necessary sustaining bias from the gate terminal 90 of the SCR5 which cuts off, silencing the audible alarm means 100.

At the same time, the gate terminal 54 of the SCR2 is connected with the power source 10 through diode D2, junction 56, lead 58, switch bar and contacts 40 and 46, respectively, and resistor R4 resulting in the triggering of the SCR2.

Because of the capacitor C3, the SCR2 is continuously conductive and supplies a constant voltage through the resistor R2. Thus, a gate current is continuously applied through the resistor R1 to the gate terminal 20 of the SCR1, the latter now being, therefore, continuously conducting and the visual alarm lamps L1 and L2 providing a steady signal instead of flashing.

The SCR3 and the balance of the audible alarm trigger circuit 68 are shunted out of operation by the triggering of the SCR2 and thus, the acknowledge switch SA need only be momentarily closed.

As soon as the condition being monitored returns to normal, the transducer switch $T_o$ opens and de-energizes the SCR2 and the SCR1, thus de-activating the acknowledge circuit 48 and the audible alarm energizing circuit 14, causing the alarm lamps L1 and L2 to be extinguished. Thus, a complete sequence A alarm annunciation cycle has been completed.

For the operation of the normally closed transducer means $T_c$, the visual alarm trigger circuit 68 is short circuited by the line 76 across terminals T7 and T2 and thus, the audible alarm trigger circuit 88 is also excluded from operation. The third common lead P5, however, is connected with the lead 24 via the short 70 at terminals T3 and T4 and therefore, when an abnormal condition causes the switch bar 72 to break with the contacts 74, the operation of the system is identical with that previously described.

For sequence B operation, all of the operation for sequence A is identical, the difference being that a small current through the resistor R7 keeps the alarm lamps L1 and L2 dimly illuminated.

Because of its pulse type energization via the terminal T11 and its ready extinguishment via the terminal T12, the audible alarm circuit B may be in common connection with a plurality of visual alarm circuits A. Thus, only one audible alarm means is required for multitudinous visual alarm means.

As for the visual sequence annunciator network C, the conduction of the SCR3 causes a current flow in the coupling diode DV1 and results in a charging of the coupling capacitor CV2 at the input node J8.

Initially, the rectifier DV2 charges the reference capacitor CV1 and maintains it in a charged state regardless of the condition of the alarm annunciator circuit A. The D.C. potential across the reference capacitor CV1 is applied to the anode terminal J5 of the SCRV2 and since the SCRV1 is initially non-conductive, this same potential is applied to the anode terminal J2 thereof.

Thus, when the coupling capacitor CV2 is charged, the diode DV4 is blocked by the potential at the anode terminal J2 of the SCRV1 and the resulting current path includes the resistor RV4, gate terminal J7 of the SCRV2, resistor RV3, cathode terminal J6 of the SCRV2 and lamps LV1 and LV2. This generates a potential at the said gate terminal J7 causing the SCRV2 to conduct and illuminate the lamps LV1 and LV2.

Simultaneously, a parallel current path is established through the SCRV2, its cathode terminal J6, diode DV3, resistor RV5, gate terminal J4 of the SCRV1 and resistor RV2. This generates a potential at the said gate terminal J4 which renders the SCRV1 conductive and causes the potential at its anode terminal J2 to drop sharply. This drop in potential at the anode terminal J2 causes the previously blocked diode DV4 to conduct and remain conductive for so long as the visual sequence network C remains in its energized state. The purpose of the diode DV4 will be hereinafter more fully described in connection with the description of FIGURE 3.

*Circuit responsive to momentary faults*

Figure 2:
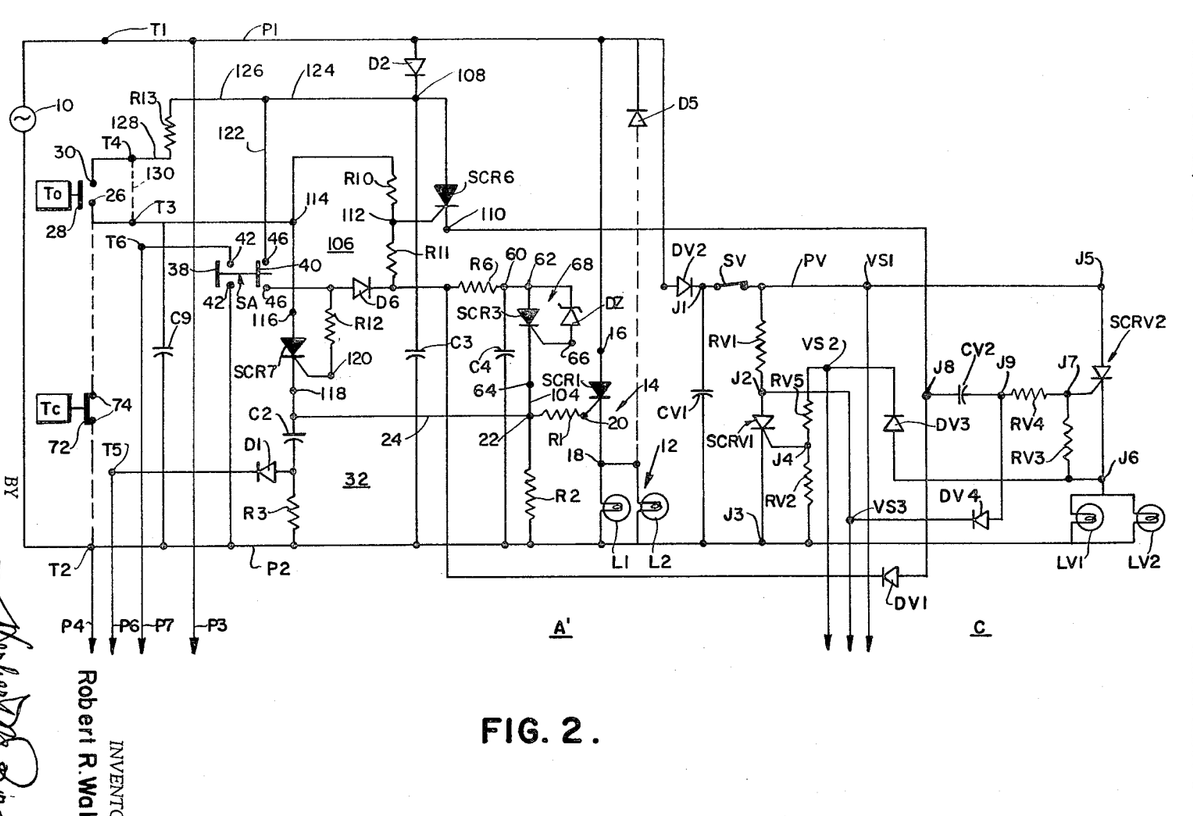
FIGURE 2 is a schematic of a second embodiment of an alarm annunciator circuit and associated visual sequence annunciator circuit of the present invention.

Referring now to FIGURE 2, a second embodiment A' of the visual alarm and sensing circuit A, of FIGURE 1, will now be described, like elements to those of FIGURE 1 bearing like numerals.

In this embodiment, the SCR1 is alternatively shunted by a fifth half-wave diode D5, connected at its cathode to the first power lead P1 and at its anode to the cathode terminal 18 of the SCR1 for a purpose to be hereinafter described.

The trigger circuit 68 for the visual alarm means 12 is connected directly with the alarm energizing circuit 14 by a lead 104 which connects the cathode terminal 64 of the SCR3 with the common node 22 in the gate circuit of the SCR1.

The visual alarm trigger circuit 68 is selectively powered from the A.C. source 10 via a sixth silicon controlled rectifier SCR6, hereinafter referred to merely as SCR6, which also comprises an active element in an acknowledge trigger circuit 106. The SCR6 includes an anode terminal 108 connected via the diode D2 to the first power lead P1, a cathode terminal 110 connected via the coupling diode DV1 and the sixth resistor R6 to the anode terminal 62 of the SCR3, and a gate terminal 112 comprising the common junction of a voltage divider consisting of tenth and eleventh series resistors R10 and R11, respectively.

The resistor R10 is connected at its outer end with a junction point 114 common to both the third circuit terminal T3 of the circuit A' and the anode terminal 116 of a seventh silicon controlled rectifier SCR7, hereinafter referred to merely as SCR7, the said SCR7 further including cathode and gate terminals 118 and 120, respectively. The resistor R11 is commonly connected at its outer end with the junction between the cathode of the coupling diode DV1 and the sixth resistor R6. A third capacitor C3 is connected between the anode 108 of the SCR6 and the second or common power lead P2.

The cathode terminal 118 of the SCR7 is connected with the outer terminal of the second capacitor C2 in the signal coupling circuit 32.

The gate terminal 120 of the SCR7 is connected via a twelfth resistor R12 with the anode of a sixth diode D6, said anode being directly connected with one of the second pair of contacts 46 of the acknowledge switch SA. The cathode of the said sixth diode D6 is connected directly to the junction between the cathode terminal of the coupling diode DV1 and the sixth resistor R6.

The other of the second pair of contacts 46 in the acknowledge switch SA is connected directly to the anode terminal 108 of the SCR6 via the series path comprising leads 122 and 124 and is connected to the fourth circuit terminal T4 via the series path comprising leads 122 and 126, thirteenth resistor R13 and lead 128.

The anode terminal 116 of the SCR7, common node 114 and the third circuit terminal T3 are all connected with the second or common power lead P2 through a ninth capacitor C9, thus completing the acknowledge trigger circuit 106.

The normally open transducer or detector switch $T_0$ has its contacts 26 and 30 connected, respectively, with circuit terminals T3 and T4.

For using a normally closed detector switch $T_c$, the pair of contacts 74 thereof are respectively connected to the circuit terminals T2 and T3; and the circuit terminals T3 and T4 are additionally short circuited via a jumper 130 as shown by dotted lines in FIGURE 2.

As already illustrated in FIGURE 1, the circuit terminals T1, T2, T5 and T6 of the sensing and visual alarm circuit A' are to be interconnected with the terminals T9, T10, T11 and T12, respectively, of the audible alarm circuit B.

*Operation*

Referring further to FIGURE 2, the operation of this embodiment of the invention will now be described.

As previously described in conjunction with FIGURE 1, the SCR1 controls the conduction of positive half-cycles of current from the A.C. power source 10 to the signal lamps L1 and L2 when gate signals of the proper magnitude are applied to the common junction 22 in the gate circuit of the SCR1.

The optional or fifth diode D5 is utilized during sequence B operation whereby it continuously operates the lamps L1 and L2 on negative half-cycles from the A.C. source 10 at the half-wave power level while, when the SCR1 is switched on, the lamps L1 and L2 burn more brightly, being illuminated at the full-wave power level. This embodiment substantially eliminates the power dissipation and heat rise caused by the resistor R7 in the embodiment of FIGURE 1.

The third capacitor C3 is charged via the second diode D2 to impose a D.C. potential between the fourth circuit terminal T4 and the common power lead P2.

Assuming that the normally open detector switch $T_0$ is connected as the remote or field sensing element, and further, that the contacts 26 and 30 thereof have been shorted by the contact bar 28, the positive potential stored in the third capacitor C3 is connected to the anode terminal 116 of the SCR7 via the series path comprising leads 124, 126, resistor R13, lead 128, terminals T4, transducer $T_o$, terminal T3 and common junction 114. This potential is also applied via the common junction 114 and the voltage divider R10–R11 to the gate terminal 112 of the SCR6, whereby the SCR6 is triggered into the conductive state.

This causes positive half-cycles to be applied to the fourth capacitor C4 via coupling diode DV1 and resistor R6 causing it to charge to a potential exceeding the breakdown voltage of Zener diode DZ, said potential being applied via anode terminal 62 of SCR3 to the visual alarm trigger circuit 68 which cooperates with the alarm energizing circuit 14, as already described in conjunction with FIGURE 1, to produce a flashing visual alarm via the lamps L1 and L2.

If the closing of the detecting transducer $T_o$ has been of a momentary nature, the flashing signal will be initiated and then maintained because the charge on capacitor C3 will maintain a D.C. anode potential supply at the anode terminal 108 of SCR6 holding it in conduction. However, no D.C. potential will be applied to the anode terminal 116 of the SCR7, and thus, when the second pair of contacts 46 of the acknowledge switch SA are closed by the circuit operator in response to the visual flashing and audible signals, no conduction of the SCR7 occurs. But the closing of said contacts 46 causes a shunting of the SCR6 through the sixth diode D6, resulting in the extinguishment of the SCR6 and the flashing signal lamps L1 and L2.

Had the closing of the detecting transducer $T_o$ been prolonged, the positive potential at the anode terminal 116 of the SCR7 and the potential applied to the gate terminal 120 thereof via the leads 124 and 122, switch bar 40, and the second contacts 46 of the acknowledge switch SA would result in the conduction of the SCR7, effecting a shunt of the third capacitor C3, extinguishing the SCR6, and providing a steady gate signal present at the common junction 22 in the gate circuit adjacent the gate termnial 20 of the SCR1 via the cathode terminal 118 of the SCR7 and the lead 24. Thus, the SCR1 is held in the conducting state to maintain a steady illumination in the signal lamps L1 and L2 commensurate with the previously defined acknowledged abnormal signal for both sequence A and sequence B operation.

In the case of using the sensing transducers TC, with normally closed contacts, the third circuit terminal T3 is held at the potential of the common lead P2 via the normally closed contacts 74 and switch bar 72 of the transducer TC. If these contacts 74, however, should open in response to an abnormal condition, this will permit the third circuit terminal T3 to rise to the same positive potential that exists across the third capacitor C3. At this point, because of the jumper lead 130 across the third and fourth circuit terminals T3 and T4, the circuit A' is in the same condition as it was initially when the normally open switch $T_o$ was closed. Thus, the subsequent operation for a prolonged opening of the normally closed switch TC is the same as previously described for the prolonged closing of the normally open switch $T_o$.

For a momentary abnormality, even though the third terminal T3 is returned to the potential of the common lead P2, the SCR6 has been triggered into conductivity and the anode terminal 116 of the SCR7 has been placed at the potential of the comon lead Pa. Thus, the closing of the acknowledge switch SA will not trigger the SCR7 and will result in a return of the signal lamps L1 and L2 in the circuit A to the state representative of a "normal" condition in the sequence A or sequence B operating modes, as the case may be.

The conduction of the SCR6 and the resulting flow of current through its cathode terminal and the coupling diode DV1 cause the identical operation of the visual sequence network C as previously set forth herein in connection with FIGURE 1.

*Multiple alarm system*

Figure 3:
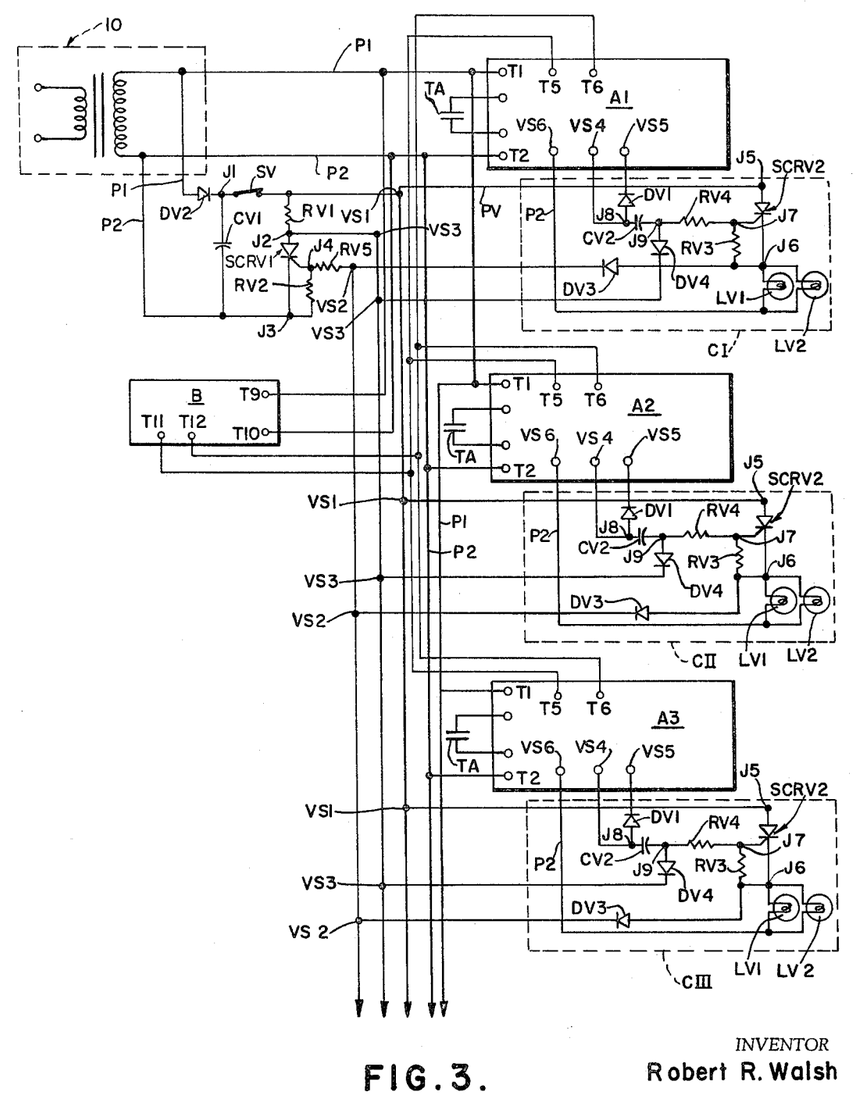
FIGURE 3 is a schematic in partial block diagram form of a ganged alarm annunciator system of the present invention.

Referring now to FIGURE 3, a plurality of alarm circuits are shown in a ganged monitoring system with the visual circuits A or A' of FIGURES 1 or 2, respectively, shown as individual circuit blocks A1, A2, A3 . . . , respectively, the visual sequence networks CI, CII, CIII . . . , respectively, shown in full schematic; and a single audible alarm circuit B shown as a circuit block mutually connected with all of the other circuits in FIGURE 3.

The visual annunciator circuits A1, A2, A3 . . . each include visual sequence output terminals VS4 and VS5 corresponding, with respect to the visual circuit A FIGURE 1, to the terminals 60 and 62, respectively, and with respect to the visual circuit A' of FIGURE 2, to the terminal 110 and the connection between the coupling diode DV1 and the sixth resistor R6, respectively.

The visual annunciator circuits A1, A2, A3 . . . each also include alarm contacts TA which correspond schematically to the transducer means $T_o$ and $T_c$ of FIGURES 1 and 2 and each further include a third terminal VS6 which corresponds to an extension on the common lead P2.

Common is all of the visual sequence networks CI, CII, CIII . . . is a single reference network including the SCRV1 and the reference capacitor CV1 previously described in FIGURES 1 and 2 which is interconnected to the balance of the networks CI, CII, CIII . . . via the common network terminals VS1, VS2 and VS3.

*Operation*

Assuming sequential energization of the visual alarm annunciator circuits A1, A2, A3 . . . with the circuit A1 being the first energized, there will be a charging current delivered substantially instantaneously and first in time to the coupling capacitor CV2 in the visual sequence network C1.

This causes operation of the network C1 as previously described in connection with FIGURE 1, resulting in energization of the lamps LV1 and LV2 in the network CI and a dropping of the potential at the anode terminal J2 of the SCRV1.

This drop in potential is reflected at the network terminal VS3 to which all of the normally blocked diodes DV4 in each of the networks CI, CII, CIII . . . are commonly connected. Thus, all of these diodes DV4 are rendered conductive simultaneously at a point in time corresponding to the energization of the first energized annunciator circuit AB1 and visual sequence network CI. This blocks all of the silicon controlled rectifiers SCRV2 in the networks CII, CIII . . . from being energized since the coupling capacitors CV2 therein are prevented from building up a sufficient charge.

Thus, it is readily seen that once any one of the visual sequence networks CI, CII, CIII . . . has been energized all of the other of these networks are disabled and a positive visual indication is thus provided of which of the visual alarm annunciator circuits A1, A2, A3 . . . was the first in time to be energized.

Because of the common interconnection of the audible alarm circuit B with the visual alarm circuits A1, A2, A3 . . . energization of one or more of the said visual alarm circuits will result in energization of the audible alarm circuit B.

The system can be reset for a subsequent operation by opening the reset switch SV, thus removing the anode potential from the SCRV1 and SCRV2 and causing them to be rendered nonconductive. This results in a blocking of the disabling diodes DV4 when the switch SV is reclosed and all of the circuits CI, CII, CIII . . . are again in readiness.

As can be seen from the foregoing specification and drawings, this invention provides a new and novel alarm annunciator circuit means which is highly versatile and which has only silicon controlled rectifiers as its active elements.

It is to be understood that the embodiment of the invention shown and described herein is for the purpose of example only and is not intended to limit the scope of the appended claims.

What is claimed is:

1. In an alarm annunciator circuit including a power source, audible alarm means and conditions responsive transducer means, means for automatically energizing and selectively deenergizing said audible alarm means comprising relaxation oscillator means selectively connected with said power source and actuated by said transducer means, pulse generating means connected with said oscillator means and producing energy pulses in response to the energization of said oscillator means, trigger means actuated by said pulse generating means, semiconductor switch means energized by said trigger means and connected in series with said source and said audible alarm means, and acknowledge means selectively deenergizing said trigger means and thus deenergizing said semiconductor switch means, said relaxation oscillator comprising rectifier means connected with one side of said source, resistance means in series therewith, a silicon controlled rectifier having anode, cathode and gate terminals, said anode terminal being coupled with said resistance means, a load resistor connected in series with said cathode terminal and the other side of said source, said cathode terminal being further coupled with said semiconductor switch means, capacitance means connected from said anode terminal to the said other side of said source, and a Zener diode connected between said anode terminal and said gate terminal; and means providing a visual indication of the energization of said alarm annunciator circuit supplemental to said visual alarm means comprising visual indicator means, second semiconductor switch means selectively interconnecting said visual indicator means with said power source in response to energization of said relaxation oscillator means, and blocking means interconnected with said second semiconductor switch means adapted to be selectively energized to prevent actuation of said second semiconductor switch means and interconnection of said visual indicator means with said power source.

2. In an alarm annunciator circuit including a power source, condition responsive transducer means and a visual alarm means having a normally quiescent state of energization, means for automatically energizing said alarm tary responses of said transducer means and subsequent to the respective ones of said responses selectively energizing said alarm means continuously and returning said alarm means to its quiescent state, respectively, comprising relaxation oscillator means selectively connected with said power source and actuated by said transducer means, semiconductor switch means periodically triggered by said oscillator means interconnected with said source and said alarm means, and acknowledge means deenergizing said oscillator means and continuously energizing said semiconductor switch means in the event of said prolonged responses of said transducer means including first and second semiconductor means, said first semiconductor means interconnected with and controlling the energization of said oscillator means, and said second semiconductor means disabling said first semiconductor means, said oscillator means and said semiconductor switch means in the event of said momentary responses of said transducer means and maintaining a state of energization in said semiconductor switch means in the event of said prolonged responses wherein said relaxation oscillator means includes rectifier means connected with one side of said source, resistance means in series therewith, a silicon controlled rectifier having anode, cathode and gate terminals, said anode terminal being coupled with said resistance means, a load resistor connected in series with said cathode terminal and the other side of said source, said cathode terminal being further coupled with said semiconductor switch means, capacitance means connected from said anode terminal to the said other side of said source, and a Zener diode connected between said anode terminal and said gate terminal; and means providing a visual indication of the energization of said alarm annunciator circuit supplemental to said visual alarm means comprising visual indicator means, second semiconductor switch means selectively interconnecting said visual indicator means with said power source in response to energization of said relaxation oscillator means, and blocking means interconnected with said second semiconductor switch means adapted to be selectively energized to prevent actuation of said second semiconductor switch means and interconnection of said visual indicator means with said power source.

3. In an alarm annunciator circuit including a power source, visual alarm means, and audible alarm means, means actuating said alarm means from an initial state to another in response to a predetermined condition comprising transducer means monitoring said condition, relaxation oscillator means selectively connected with said power source and actuated by said transducer means, first semiconductor switch means periodically triggered by said oscillator means connected with said source and said alarm means comprising intermittent energizing means for said visual alarm means, pulse generating means energized by said oscillator means, trigger means interconnected with and actuated by said pulse generating means, second semiconductor switch means for said audible alarm means interconnected with and actuated by said trigger means, and acknowledge means selectively deenergizing said audible alarm means and constraining said semiconductor switch means to continuously energize said visual alarm means including means deactuating said trigger means and said oscillator means in the event of a prolonged occurrence of said predetermined condition and further, in the event of a momentary occurrence of said predetermined condition, including means deactuating said semiconductor switch means to return said visual alarm means to its initial state and deactuating said trigger means and said oscillator means; wherein said relaxation oscillator means includes rectifier means connected with one side of said source, resistance means in series therewith, a silicon controlled rectifier having anode, cathode and gate treminals, said anode terminal being coupled with said resistance means, a load resistor connected in series with said cathode terminal and the other side of said source, said cathode terminal being further coupled with said semiconductor switch means, capacitance means connected from said anode terminal to the said other side of said source, and a Zener diode connected between said anode terminal and said gate terminal; and means providing a visual indication of the energization of said alarm annunciator circuit supplemental to said visual alarm means comprising visual indicator means, third semiconductor switch means selectively interconnecting said visual indicator means with said power source in response to energization of said relaxation oscillator means, and blocking means interconnected with said second semiconductor switch means adapted to be selectively energized to prevent actuation of said second semiconductor switch means and interconnection of said visual indicator means with said power source.

4. In an alarm annunciator circuit including a power source, visual alarm means, and audible alarm means, means actuating said alarm means from an initial state to another in response to a predetermined condition comprising transducer means monitoring said condition, relaxation oscillator means selectively connected with said power source and actuated by said transducer means, first semiconductor switch means periodically triggered by said first oscillator means connected with said source and said alarm means comprising intermittent energizing means for said visual alarm means, pulse generating means energized by said first oscillator means, trigger means interconnected with and actuated by said pulse generating means, second semiconductor switch means for said audible alarm means interconnected with and actuated by said trigger means, and acknowledge means comprising first switch means selectively shunting said source from said trigger means, third semiconductor switch means in series with said source and said relaxation oscillator means, second switch means selectively shunting said source from said third semiconductor switch means, and fourth semiconductor switch means in circuit with said transducer means selectively shunting said source from said relaxation oscillator means and interconnected with said first semiconductor switch means; and means providing a visual indication of the energization of said alarm annunciator circuit supplemental to said visual alarm means, comprising supplemental indicator means, fifth semiconductor switch means selectively interconnecting said visual indicator means with said power source in response to energization of said relaxation oscillator means, and blocking means interconnected with said second semiconductor switch means adapted to be selectively energized to prevent actuation of said second semiconductor switch means and interconnection of said visual indicator means with said power source.

5. In an alarm annunciator system including a plurality of alarm annunciator circuits adapted to be energized substantially simultaneously in response to the occurrence of preselected conditions, sequence indicator means providing an indication of the first in time of said annunciator circuits to be energized comprising first semiconductor switch means, a source of reference potential connected across said first semiconductor switch means, a plurality of second semiconductor switch means interconnected one with each of said alarm annunciator circuits, said source of reference potential being connected across each of said second semiconductor switch means, a plurality of visual alarm means interconnected one with each of said second semiconductor switch means and selectively connected across said source of reference potential to be energized thereby in response to the energization of respective ones of said alarm annunciator circuits, and a plurality of disabling means connected one between each of said second semiconductor switch means and said first semiconductor switch means selectively controlled by said first semiconductor switch means to prevent actuation of the remainder of all said second semiconductor switch means and said visual alarm means after one of said second semiconductor, switch means and associated visual alarm means have been first actuated.

6. In an alarm annunciator system including a plurality of alarm annunciator circuits adapted to be energized substantially simultaneously in response to the occurrence of preselected conditions, sequence indicator means providing an indication of the first in time of said annunciator circuits to be energized, each of said alarm annunciator circuits including output means providing an output signal in response to the energization thereof, comprising first semiconductor switch means, a source of reference potential connected across said first semiconductor switch means, a plurality of second semiconductor switch means, each including a control terminal associated one with each of said alarm annunciator circuits and interconnected therewith, respectively, by a like plurality of coupling means, an input circuit for each of said second semiconductor switch means interconnected with said coupling means and said control terminal, said source of reference potential being connected across each of said second semiconductor switch means, a plurality of visual alarm means interconnected one with each of said second semiconductor switch means and selectively connected across said source of reference potential to be energized thereby in response to the energization of respective ones of said alarm annunciator circuits, blocking means connected between each of said input circuits and said first semiconductor switch means selectively controlled by said first semiconductor switch means to selectively prevent the admission of said output signal through the remainder of all said input circuits to said control terminals after one of said input circuits and its associated said semiconductor switch means and visual alarm means have been first energized by a respective one of said output signals.

7. The invention defined in claim 6, wherein said first and second semiconductor switch means each comprises a silicon controlled rectifier having anode and cathode terminals, said anode terminal of said first semiconductor switch means being connected with said blocking means; and wherein said first semiconductor switch means further includes a control terminal interconnected with the cathode terminals of said second semiconductor switch means.

8. The invention defined in claim 6, wherein said source of reference potential comprises an alternating current source, a half-wave rectifier in series with said alternating current source, and a reference capacitor in series with said half-wave rectifier; wherein said first and second semiconductor switch means each comprise silicon controlled rectifiers having anode and cathode terminals, said first switch means including a control terminal; wherein said first switch means is connected across said reference capacitor in series with a resistance means connected at its anode terminal; wherein said second switch means is connected across said reference capacitor in series with said visual alarm means connected at its cathode terminal; wherein said anode terminal of said first switch means is connected with said blocking means; wherein said control terminal of said first switch means is coupled with said cathode terminals of said second switch means; and wherein said anode terminals of said second switch means are connected with said reference capacitor.

9. The invention defined in claim 6, wherein said source of reference potential comprises an alternating current source, a half-wave rectifier in series with said alternating current source, and a reference capacitor in series with said half-wave rectifier; wherein said first and second semiconductor switch means each comprise silicon controlled rectifiers having anode and cathode terminals, said first switch means including a control terminal; wherein said first switch means is connected across said reference capacitor in series with a resistance means connected at its anode terminal; wherein said second switch means is connected across said reference capacitor in series with said visual alarm means connected at its cathode terminal; wherein said input circuits each include a coupling capacitor between said coupling means and said control terminal of said control switch means; wherein each said blocking means comprises a diode having anode and cathode terminals, its anode being connected intermediate said coupling capacitor and said control terminals of said second switch means and its cathode being connected with the anode terminal of said first switch means; wherein said control terminal of said first switch means is coupled with said cathode terminals of said second switch means; and wherein said anode terminals of said second switch means are connected with said reference capacitor.

10. The invention defined in claim 5, wherein said sequence indicator means further includes reset means comprising means selectively and momentarily disconnecting said source of reference potential from said first and second semiconductor switch means.

11. The invention defined in claim 6, wherein said sequence indicator means further includes reset means comprising means selectively and momentarily disconnecting said source of reference potential from said first and second semiconductor switch means.

References Cited

UNITED STATES PATENTS

| | | | |
|---|---|---|---|
| 3,029,421 | 4/1962 | Beguin. | |
| 3,124,793 | 3/1964 | Foster | 340—213.2 |
| 3,193,814 | 7/1965 | Foster | 340—223 |
| 3,212,079 | 10/1965 | Huttner | 340—212.1 |

FOREIGN PATENTS 1,238,411   7/1960   France.

JOHN W. CALDWELL, *Primary Examiner.*

NEIL C. READ, THOMAS B. HABECKER, *Examiners.*

R. M. ANGUS, D. J. YUSKE, *Assistant Examiners.*